(12) United States Patent
Vasey

(10) Patent No.: US 9,122,667 B2
(45) Date of Patent: Sep. 1, 2015

(54) PARTIALLY CUSTOMIZED DOCUMENT GENERATION

(75) Inventor: Philip Edgar Vasey, Cambridge (GB)

(73) Assignee: BUSINESS INTEGRITY LIMITED (GB)

( * ) Notice: Subject to any disclaimer, the term of this patent is extended or adjusted under 35 U.S.C. 154(b) by 1308 days.

(21) Appl. No.: 10/347,785

(22) Filed: Jan. 20, 2003

(65) Prior Publication Data

US 2003/0140053 A1 Jul. 24, 2003

(30) Foreign Application Priority Data

Jan. 21, 2002 (EP) .................................. 02250396

(51) Int. Cl.
*G06F 17/00* (2006.01)
*G06F 17/24* (2006.01)
*G06F 17/21* (2006.01)

(52) U.S. Cl.
CPC ............ *G06F 17/243* (2013.01); *G06F 17/211* (2013.01); *G06F 17/218* (2013.01); *G06F 17/248* (2013.01)

(58) Field of Classification Search
CPC .... G06F 17/248; G06F 17/211; G06F 17/218
USPC ................ 715/530, 513, 760, 271, 272, 209
See application file for complete search history.

(56) References Cited

U.S. PATENT DOCUMENTS

| 5,272,623 | A | * | 12/1993 | Grubb et al. .................. 717/100 |
| 5,627,973 | A | * | 5/1997 | Armstrong et al. ............ 705/10 |
| 6,182,095 | B1 | * | 1/2001 | Leymaster et al. ........... 715/515 |
| 6,571,214 | B2 | * | 5/2003 | Newman et al. ................. 705/2 |
| 6,594,638 | B1 | * | 7/2003 | Feldman et al. ............... 705/14 |
| 6,854,086 | B2 | * | 2/2005 | Umen et al. .................. 715/513 |
| 2003/0023698 | A1 | * | 1/2003 | Dieberger et al. ............ 709/207 |
| 2004/0177002 | A1 | * | 9/2004 | Abelow .......................... 705/14 |
| 2004/0220815 | A1 | * | 11/2004 | Belanger et al. ................. 705/1 |

FOREIGN PATENT DOCUMENTS

| EP | 0 475 964 B1 | 5/1997 |
| EP | 0 481 995 B1 | 5/1997 |
| EP | 843266 A2 | 5/1998 |
| WO | WO 01/04772 A2 | 1/2001 |

* cited by examiner

*Primary Examiner* — Adam M Queler
(74) *Attorney, Agent, or Firm* — Anderson Gorecki & Rouille LLP

(57) ABSTRACT

A document generation system for generating a customized document using predetermined elements of document content selected by rules operating on input information, is configured to generate a partially customized document by evaluating some of the rules to select some of the predetermined elements, and associating other of the rules and corresponding predetermined elements with the partially customized document for later use in generating a further customized document.

13 Claims, 22 Drawing Sheets

---

LAW
[¹This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.₁]
[²This Agreement shall be governed in all respects by the Laws of Scotland. The parties hereto agree that any suit, action or proceeding in relation to any claim, dispute or difference which may arise under this Agreement shall be brought in the High Court of Edinburgh, and irrevocably and unconditionally submit to the non-exclusive jurisdiction of the High Court of Edinburgh.₂]
[³This Agreement shall be governed in all respects by Japanese Law. The parties hereto agree that any suit, action or proceeding in relation to any claim, dispute or difference which may arise under this Agreement shall be brought in the [⁴Tokyo₄][⁵Kyoto₅] District Court, and irrevocably and unconditionally submit to the non-exclusive jurisdiction of the [⁴Tokyo₄][⁵Kyoto₅] District Court.₃]

| 1 | Jurisdiction IS "England and Wales" |
| 2 | Jurisdiction IS "Scotland" |
| 3 | Jurisdiction IS "Japan" |
| 4 | JapaneseCourt IS "Tokyo" |
| 5 | JapaneseCourt IS "Kyoto" |

Fig. 5a

LAW

[¹This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.₁]

[²This Agreement shall be governed in all respects by the Laws of Scotland. The parties hereto agree that any suit, action or proceeding in relation to any claim, dispute or difference which may arise under this Agreement shall be brought in the High Court of Edinburgh, and irrevocably and unconditionally submit to the non-exclusive jurisdiction of the High Court of Edinburgh.₂]

| 1 | Jurisdiction IS "England and Wales" |
| 2 | Jurisdiction IS "Scotland" |

Fig 5b

LAW

This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.

Fig 5c

LAW

This Agreement shall be governed in all respects by the Laws of Scotland. The parties hereto agree that any suit, action or proceeding in relation to any claim, dispute or difference which may arise under this Agreement shall be brought in the High Court of Edinburgh, and irrevocably and unconditionally submit to the non-exclusive jurisdiction of the High Court of Edinburgh.

Fig. 6a

| AND | true | false |
|---|---|---|
| true | true | false |
| false | false | false |

Fig 6b

| OR | true | false |
|---|---|---|
| true | true | true |
| false | true | false |

Fig. 6c

| XOR | true | false |
|---|---|---|
| true | false | true |
| false | true | false |

Fig 6d

| NOT | true | false |
|---|---|---|
| | false | true |

Fig. 7a

| AND | true | false | indefinite |
|---|---|---|---|
| true | true | false | indefinite |
| false | false | false | indefinite |
| indefinite | indefinite | indefinite | indefinite |

Fig. 7b

| OR | true | false | indefinite |
|---|---|---|---|
| true | true | true | true |
| false | true | false | indefinite |
| indefinite | true | indefinite | indefinite |

Fig. 7c

| XOR | true | false | indefinite |
|---|---|---|---|
| true | false | true | indefinite |
| false | true | false | indefinite |
| indefinite | indefinite | indefinite | indefinite |

Fig. 7d

| NOT | true | false | indefinite |
|---|---|---|---|
| | false | true | indefinite |

Fig. 8

| Comparison | | | | State | If |
|---|---|---|---|---|---|
| Variable | Compare | | Calculation | | |
| SURE | $value_1$ | IS | $value_2$ | true | $value_1 = value_2$ |
| SURE | $value_1$ | IS | $value_2$ | false | $value_1 \neq value_2$ |
| UNSURE | $value_1$ | IS | $value_2$ | indefinite | $value_1 = value_2$ |
| UNSURE | $value_1$ | IS | $value_2$ | false | $value_1 \neq value_2$ |
| DEFERRED | | IS | $value_2$ | indefinite | |
| SURE | $value_1$ | IS NOT | $value_2$ | false | $value_1 = value_2$ |
| SURE | $value_1$ | IS NOT | $value_2$ | true | $value_1 \neq value_2$ |
| UNSURE | $value_1$ | IS NOT | $value_2$ | false | $value_1 = value_2$ |
| UNSURE | $value_1$ | IS NOT | $value_2$ | indefinite | $value_1 \neq value_2$ |
| DEFERRED | | IS NOT | $value_2$ | indefinite | |
| SURE | $value_1$ | LESS THAN | $value_2$ | false | $value_1 < value_2$ |
| SURE | $value_1$ | LESS THAN | $value_2$ | true | $value_1 \geq value_2$ |
| UNSURE | $value_1$ | LESS THAN | $value_2$ | false | $value_1 < value_2$ |
| UNSURE | $value_1$ | LESS THAN | $value_2$ | indefinite | $value_1 \geq value_2$ |
| DEFERRED | | LESS THAN | $value_2$ | indefinite | |
| SURE | $value_1$ | MORE THAN | $value_2$ | false | $value_1 > value_2$ |
| SURE | $value_1$ | MORE THAN | $value_2$ | true | $value_1 \leq value_2$ |
| UNSURE | $value_1$ | MORE THAN | $value_2$ | false | $value_1 > value_2$ |
| UNSURE | $value_1$ | MORE THAN | $value_2$ | indefinite | $value_1 \leq value_2$ |
| DEFERRED | | MORE THAN | $value_2$ | indefinite | |

Fig 9

LAW
[¹This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.$_1$]
[²This Agreement shall be governed in all respects by the Laws of Scotland. The parties hereto agree that any suit, action or proceeding in relation to any claim, dispute or difference which may arise under this Agreement shall be brought in the High Court of Edinburgh, and irrevocably and unconditionally submit to the non-exclusive jurisdiction of the High Court of Edinburgh.$_2$]
[³This Agreement shall be governed in all respects by Japanese Law. The parties hereto agree that any suit, action or proceeding in relation to any claim, dispute or difference which may arise under this Agreement shall be brought in the [⁴Tokyo$_4$][⁵Kyoto$_5$] District Court, and irrevocably and unconditionally submit to the non-exclusive jurisdiction of the [⁴Tokyo$_4$][⁵Kyoto$_5$] District Court.$_3$]

| | |
|---|---|
| 1 | Jurisdiction IS "England and Wales" |
| 2 | Jurisdiction IS "Scotland" |
| 3 | Jurisdiction IS "Japan" |
| 4 | JapaneseCourt IS "Tokyo" |
| 5 | JapaneseCourt IS "Kyoto" |

Fig 10a

| Prompt | Input | Defer | Unsure |
|---|---|---|---|
| Select the jurisdiction | ○ England and Wales<br>○ Scotland<br>⦿ Japan | ☐ | ☐ |
| Select the japanese court | ⦿ Tokyo<br>○ Kyoto | ☐ | ☐ |

Fig 10b

| Prompt | Input | Defer | Unsure |
|---|---|---|---|
| Select the jurisdiction | ⦿ England and Wales<br>○ Scotland<br>○ Japan | ☐ | ☐ |
| *Select the japanese court* | | | |

Fig 10c

| Prompt | Input | Defer | Unsure |
|---|---|---|---|
| *Select the jurisdiction* | | ☑ | |
| Select the japanese court | ⦿ Tokyo<br>○ Kyoto | ☐ | ☐ |

Fig 10d

| Prompt | Input | Defer | Unsure |
|---|---|---|---|
| *Select the jurisdiction* | | ☑ | |
| *Select the japanese court* | | ☑ | |

Fig 10e

| Prompt | Input | Defer | Unsure |
|---|---|---|---|
| Select the jurisdiction | ☑ England and Wales<br>☑ Scotland<br>☑ Japan | ☐ | ☑ |
| Select the japanese court | ⦿ Tokyo<br>○ Kyoto | ☐ | ☐ |

Fig 10f

| Prompt | Input | Defer | Unsure |
|---|---|---|---|
| Select the jurisdiction | ☑ England and Wales<br>☑ Scotland<br>☑ Japan | ☐ | ☑ |
| Select the japanese court | ☑ Tokyo<br>☑ Kyoto | ☐ | ☑ |

Fig 10g

| Prompt | Input | Defer | Unsure |
|---|---|---|---|
| Select the jurisdiction | ☑ England and Wales<br>☑ Scotland<br>☐ Japan | ☐ | ☑ |
| *Select the japanese court* | | | |

Fig 11a

| Prompt | Input | Defer | Unsure |
|---|---|---|---|
| Select the jurisdiction | ⦿ England and Wales<br>○ Scotland<br>○ Japan | ☐ | ☐ |
| Select the japanese court | ○ Tokyo<br>○ Kyoto | ☐ | |

Fig 11b

| | |
|---|---|
| Jurisdiction IS "England and Wales" | true |
| Jursidiction IS "Scotland" | false |
| Jurisdiction IS "Japan" | false |
| JapaneseCourt IS "Tokyo" | |
| JapaneseCourt IS "Kyoto" | |

Fig 11c

LAW
This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.

Fig 12a

| Prompt | Input | Defer | Unsure |
|---|---|---|---|
| Select the jurisdiction | ○ England and Wales<br>⦿ Scotland<br>○ Japan | ☐ | ☐ |
| Select the japanese court | ⦿ Tokyo<br>○ Kyoto | ☐ | |

Fig 12b

| | |
|---|---|
| Jurisdiction IS "England and Wales" | false |
| Jursidiction IS "Scotland" | true |
| Jurisdiction IS "Japan" | false |
| JapaneseCourt IS "Tokyo" | |
| JapaneseCourt IS "Kyoto" | |

Fig 12c

LAW
This Agreement shall be governed in all respects by the Laws of Scotland. The parties hereto agree that any suit, action or proceeding in relation to any claim, dispute or difference which may arise under this Agreement shall be brought in the High Court of Edinburgh, and irrevocably and unconditionally submit to the non-exclusive jurisdiction of the High Court of Edinburgh.

Fig 13a

| Prompt | Input | Defer | Unsure |
|---|---|---|---|
| Select the jurisdiction | ○ England and Wales<br>○ Scotland<br>⊙ Japan | ☐ | ☐ |
| Select the japanese court | ⊙ Tokyo<br>○ Kyoto | ☐ | |

Fig 13b

| | |
|---|---|
| Jurisdiction IS "England and Wales" | false |
| Jursidiction IS "Scotland" | false |
| Jurisdiction IS "Japan" | true |
| JapaneseCourt IS "Tokyo" | true |
| JapaneseCourt IS "Kyoto" | false |

Fig 13c

LAW
This Agreement shall be governed in all respects by Japanese Law. The parties hereto agree that any suit, action or proceeding in relation to any claim, dispute or difference which may arise under this Agreement shall be brought in the Tokyo District Court, and irrevocably and unconditionally submit to the non-exclusive jurisdiction of the Tokyo District Court.

Fig 14a

| Prompt | Input | Defer | Unsure |
|---|---|---|---|
| Select the jurisdiction | ○ England and Wales<br>○ Scotland<br>⦿ Japan | ☐ | ☐ |
| Select the japanese court | ○ Tokyo<br>⦿ Kyoto | ☐ | |

Fig 14b

| | |
|---|---|
| Jurisdiction IS "England and Wales" | false |
| Jursidiction IS "Scotland" | false |
| Jurisdiction IS "Japan" | true |
| JapaneseCourt IS "Tokyo" | false |
| JapaneseCourt IS "Kyoto" | true |

Fig 14c

LAW
This Agreement shall be governed in all respects by Japanese Law. The parties hereto agree that any suit, action or proceeding in relation to any claim, dispute or difference which may arise under this Agreement shall be brought in the Kyoto District Court, and irrevocably and unconditionally submit to the non-exclusive jurisdiction of the Kyoto District Court.

Fig 15a

| Prompt | Input | Defer | Unsure |
|---|---|---|---|
| Select the jurisdiction | ○ England and Wales<br>○ Scotland<br>⦿ Japan | ☐ | ☐ |
| Select the japanese court | ○ Tokyo<br>⦿ Kyoto | ☑ | |

Fig 15b

| | |
|---|---|
| Jurisdiction IS "England and Wales" | false |
| Jursidiction IS "Scotland" | false |
| Jurisdiction IS "Japan" | true |
| JapaneseCourt IS "Tokyo" | indefinite |
| JapaneseCourt IS "Kyoto" | indefinite |

Fig 15c

LAW
This Agreement shall be governed in all respects by Japanese Law. The parties hereto agree that any suit, action or proceeding in relation to any claim, dispute or difference which may arise under this Agreement shall be brought in the [$^1$Tokyo$_1$][$^2$Kyoto$_2$] District Court, and irrevocably and unconditionally submit to the non-exclusive jurisdiction of the [$^1$Tokyo$_1$][$^2$Kyoto$_2$] District Court.

[1]     JapaneseCourt IS "Tokyo"
[2]     JapaneseCourt IS "Kyoto"

Fig 16a

| Prompt | Input | Defer | Unsure |
|---|---|---|---|
| Select the jurisdiction | ○ England and Wales<br>○ Scotland<br>○ Japan | ☑ | ☐ |
| Select the japanese court | ○ Tokyo<br>○ Kyoto | ☑ | |

Fig 16b

| | |
|---|---|
| Jurisdiction IS "England and Wales" | indefinite |
| Jursidiction IS "Scotland" | indefinite |
| Jurisdiction IS "Japan" | indefinite |
| JapaneseCourt IS "Tokyo" | indefinite |
| JapaneseCourt IS "Kyoto" | indefinite |

Fig 16c

LAW

[¹This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.$_1$]

[²This Agreement shall be governed in all respects by the Laws of Scotland. The parties hereto agree that any suit, action or proceeding in relation to any claim, dispute or difference which may arise under this Agreement shall be brought in the High Court of Edinburgh, and irrevocably and unconditionally submit to the non-exclusive jurisdiction of the High Court of Edinburgh.$_2$]

[³This Agreement shall be governed in all respects by Japanese Law. The parties hereto agree that any suit, action or proceeding in relation to any claim, dispute or difference which may arise under this Agreement shall be brought in the [⁴Tokyo$_4$][⁵Kyoto$_5$] District Court, and irrevocably and unconditionally submit to the non-exclusive jurisdiction of the [⁴Tokyo$_4$][⁵Kyoto$_5$] District Court.$_3$]

| | |
|---|---|
| 1 | Jurisdiction IS "England and Wales" |
| 2 | Jurisdiction IS "Scotland" |
| 3 | Jurisdiction IS "Japan" |
| 4 | JapaneseCourt IS "Tokyo" |
| 5 | JapaneseCourt IS "Kyoto" |

Fig 17a

| Prompt | Input | Defer | Unsure |
|---|---|---|---|
| Select the jurisdiction | ☑ England and Wales<br>☑ Scotland<br>☐ Japan | | ☑ |
| Select the japanese court | ◉ Tokyo<br>○ Kyoto | | ☐ |

Fig 17b

| | |
|---|---|
| Jurisdiction IS "England and Wales" | indefinite |
| Jursidiction IS "Scotland" | indefinite |
| Jurisdiction IS "Japan" | false |
| JapaneseCourt IS "Tokyo" | |
| JapaneseCourt IS "Kyoto" | |

Fig 17c

LAW
[[1]This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.[1]]
[[2]This Agreement shall be governed in all respects by the Laws of Scotland. The parties hereto agree that any suit, action or proceeding in relation to any claim, dispute or difference which may arise under this Agreement shall be brought in the High Court of Edinburgh, and irrevocably and unconditionally submit to the non-exclusive jurisdiction of the High Court of Edinburgh.[2]]

[1]   Jurisdiction IS "England and Wales"
[2]   Jurisdiction IS "Scotland"

Fig 18a

| Prompt | Input | Defer | Unsure |
|---|---|---|---|
| Select the jurisdiction | ☑ England and Wales<br>☐ Scotland<br>☑ Japan | | ☑ |
| Select the japanese court | ○ Tokyo<br>◉ Kyoto | ☐ | |

Fig 18b

| | |
|---|---|
| Jurisdiction IS "England and Wales" | indefinite |
| Jursidiction IS "Scotland" | false |
| Jurisdiction IS "Japan" | indefinite |
| JapaneseCourt IS "Tokyo" | false |
| JapaneseCourt IS "Kyoto" | true |

Fig 18c

LAW
[¹This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.₁]
[²This Agreement shall be governed in all respects by Japanese Law. The parties hereto agree that any suit, action or proceeding in relation to any claim, dispute or difference which may arise under this Agreement shall be brought in the Kyoto District Court, and irrevocably and unconditionally submit to the non-exclusive jurisdiction of the Kyoto District Court.₂]

| 1 | Jurisdiction IS "England and Wales" |
| 2 | Jurisdiction IS "Japan" |

Fig 19a

| Prompt | Input | Defer | Unsure |
|---|---|---|---|
| Select the jurisdiction | ☑ England and Wales<br>☐ Scotland<br>☑ Japan | | ☑ |
| Select the japanese court | ○ Tokyo<br>⦿ Kyoto | ☑ | |

Fig 19b

| | |
|---|---|
| Jurisdiction IS "England and Wales" | indefinite |
| Jursidiction IS "Scotland" | false |
| Jurisdiction IS "Japan" | indefinite |
| JapaneseCourt IS "Tokyo" | indefinite |
| JapaneseCourt IS "Kyoto" | indefinite |

Fig 19c

LAW
[¹This Agreement shall be governed in all respects by the Laws of England and Wales. The parties hereto agree that any suit, action or proceeding in relation to any claim, dispute or difference which may arise under this Agreement shall be brought in the High Court of London, and irrevocably and unconditionally submit to the non-exclusive jurisdiction of the High Court of London.$_1$]
[²This Agreement shall be governed in all respects by Japanese Law. The parties hereto agree that any suit, action or proceeding in relation to any claim, dispute or difference which may arise under this Agreement shall be brought in the [³Tokyo$_3$][⁴Kyoto$_4$] District Court, and irrevocably and unconditionally submit to the non-exclusive jurisdiction of the [³Tokyo$_3$][⁴Kyoto$_4$] District Court.$_2$]

| | |
|---|---|
| 1 | Jurisdiction IS "England and Wales" |
| 2 | Jurisdiction IS "Japan" |
| 3 | JapaneseCourt IS "Tokyo" |
| 4 | JapaneseCourt IS "Kyoto" |

PARTIALLY CUSTOMIZED DOCUMENT GENERATION

BACKGROUND OF THE INVENTION

1. Field of the Invention

The present invention relates to rule-based document generation systems for generating customized documents from document templates. In particular, but not exclusively, the present invention relates to generating customized documents using predetermined elements of content for possible use when generating a customized document and associated rules for determining the use to be made of the predetermined elements of content when generating a customized document.

2. Description of the Related Art

Manual and computer-implemented approaches to generating customized documents from document precedents or templates are known.

Manual approaches typically involve starting with a written or printed standard form document (such as a standard form contract or other legal precedent) and filling in any missing information (such as the names of the parties) as well as deciding whether to include any optional portions or choosing between alternative portions (such as optional or alternative contract clauses) to create the final customized document. Some standard form documents include instructions to help the creator of the customized document fill in any missing information and decide what to do with any optional or alternative portions.

Computer-implemented approaches to document generation are becoming increasingly important. Computer-implemented document generation systems often use electronically stored document templates comprising predetermined elements of content (such as the text of standard form contract clauses) for possible use when generating a customized document and, associated with the predetermined elements of content, electronically stored rules (such as logical rules, criteria or formulae which depend on the value of unknown variables) for determining the use to be made of the predetermined elements of content when generating a customized document.

A known document generation system which adopts this approach is described in International Publication Number WO 01/04772 in the name of the present applicants, Business Integrity Ltd. According to this system, a server computer runs a document generation program and is capable of communicating with local or remote client computers over a local area network (LAN) or wide area network (WAN) such as the Internet. A standard document, comprising units of known information and associated logical rules, is first translated into a form suitable for processing by the document generation program. When instructed to generate a customized document, the server first generates one or more Web pages which are sent to client computers for user input of the further information required to evaluate the logical rules. Users may then submit the further information to the server. Once all the required further information has been captured, the server generates a customized document on the basis of the standard document and received further information.

One problem with document generation systems following the above approach is that all the further information required to generate a customized document may not be available from one particular source at one particular time. In other words, there may be several different items of required information and these may be 1) available only from different sources—for example from different people, databases or expert systems—or 2) available only at different times. International Publication Number WO 01/04772 provides a solution to this problem by allowing information to be captured from different sources at different times using several Web pages.

European Patent Specifications EP 0475964 B1 and EP 0481995 B1 concern related inventions. EP 0475964 B1 describes a document generation system and EP 0481995 B1 describes an expert system. Both specifications describe a concept of "don't know" values in which users may provide "don't know" as a possible input to the system in response to a query for further information required to evaluate a term (ie a variable). This is achieved by adding a predefined value "don't know" to the class of values which may be accepted by the system. The concept of "don't know dependencies" is also described. Terms which are dependent on other terms which have the value "don't know" are i) evaluated to "don't know" if no value can be determined without the other term, or ii) estimated to the extent that some value can be determined without the other term. "Don't know values" and "don't know" dependencies allow partially customized documents to be generated despite insufficient information being provided to generate a fully customized document. Where a term (such as the phone number of a client) evaluates to "don't know", the generated document includes the text "don't know" at the appropriate point.

One problem with the document generation system described in European Patent Specifications EP 0475964 B1 and EP 0481995 B1 is that, while the provision of "don't know" values may be useful in the case where the information required is simply the value of term to be inserted in a generated document at an appropriate point, it is of limited use where the information required involves the election of one or more predetermined options or alternatives from a list, which election determines whether or not corresponding optional or alternative elements of content (such as contract clauses) are to be included in the generated document. In the latter cases, where a "don't know" value is returned, none of the corresponding elements of content are included in the generated document which may therefore be of very limited use.

Furthermore, the described document generation system does not distinguish between lists of options and alternatives in that in both cases the user must either provide a definite answer or "don't know" all the listed items whether options or alternatives. In the case of option lists, this may result in information which a user may be able to provide (such as definite answers to some but not all of the options) not being captured which is inefficient.

Moreover, with the document generation systems described in both International Publication Number WO 01/04772 and in European Patent Specifications EP 0475964 B1 and EP 0481995 B1, once a process to generate a customized document has been started, using a particular document generation system operating on a particular server or computer, the process must be continued to completion using that system. This has disadvantages in that the utility of the document generation systems and generated customized documents is decreased, and in that data security is an issue, particularly where data, such as potentially confidential information provided from multiple sources over a period of time, is held on a server connected to other computers over a LAN or WAN.

SUMMARY OF CERTAIN INVENTIVE ASPECTS

According to a first aspect of the present invention, there is provided a document generation system for generating a customized document using predetermined elements of document content selected by rules operating on input information. The system is configured to generate a partially customized document by evaluating some of the rules to select some of the predetermined elements, and associating other of the rules and corresponding predetermined elements with the partially customized document for later use in generating a further customized document.

Advantageously, the first aspect allows a partially customized document to be generated from a document template, which partially customized document may itself be re-used as a document template in the same or another document generation system to continue the document generation process. Thus, the partially customized document, which may be stored in one or more data files, may be transported, for example via data storage media, between different document generation systems operating on different servers or computers so as to continue the document generation process. Thus, utility and data security are greatly enhanced, particularly for document generation processes in which information is required from different sources or at different times.

Preferably, the other rules are represented in the partially customized document in the form of mark-up of the corresponding predetermined elements. Thus, the generated partially customized document is presented in a format which may be readily understood by human beings, for the purposes of negotiation with another party for example, as well as machines.

In one embodiment, the partially customized document is generated in response to input information which is sufficient to evaluate at least some of the other rules, but which indicates that the other rules should not be evaluated. Thus, the document generation system provides increased efficiency of data capture in that partial information may be captured, for example from a user selecting some but not all the items on an option list, despite the user being unsure of the responses to all the listed items.

According to a second aspect of the present invention, there is provided a document generation system comprising:

means for accessing a document template comprising predetermined elements of content for possible use when generating a customized document;

means for accessing data associated with the document template, the data representing first and second rules for making, respectively, first and second determinations as to the use to be made of the predetermined elements of content when generating a customized document, the first and second determinations each requiring further information to be received;

means for receiving information enabling at least the first determination to be made;

means for making the first determination on the basis of the received information;

means arranged to generate a partially customized document in accordance with the outcome of the first determination; and means arranged to associate, with the generated partially customized document, data representing the second rule.

Advantageously, the second aspect allows a partially customized document to be generated from a document template which may itself be re-used as a document template in the same or another document generation system to continue the document generation process. Thus, the partially customized document, which may be stored in one or more data files, may be transported, for example via data storage media, between different document generation systems operating on different servers or computers to continue the document generation process. Thus, utility and data security are greatly enhanced, particularly for document generation processes in which information is required from different sources or at different times.

Preferably, the partially customized document comprises one or more of the predetermined elements of content selected to enable further customized documents to be generated, from the partially customized document, for each possible outcome of the second determination. Thus, the partially customized document is sufficient to enable the document generation process to be continued to completion whatever the further information is provided to enable the second determination to be made.

Preferably, the second rule is represented in the partially customized document in the form of mark-up of the selected one or more elements of content. Thus, the generated partially customized document is presented in a format which may be readily understood by human beings, for the purposes of negotiation with another party for example, as well as machines.

In one embodiment, the received information comprises at least part of the information required to enable the second determination to be made and an indication that the second determination should not be made. Thus, the document generation system provides increased efficiency of data capture in that information may be captured, for example information enabling the second determination to be made, despite the information being considered as unsure. Thus, when continuing the document generation process, using the partially customized document, the unsure information provided my be confirmed or rejected.

According to a third aspect of the present invention, there is provided a document generation system for generating a customized document using predetermined elements of document content selected by rules operating on variables, the variables representing items of input information. The system is configured to receive an indication of whether or not a state of a variable is definite. The system, when processing data in dependence on the variable, responds differently to an indication that the state is definite than to an indication that the state is not definite.

Advantageously, the third aspect allows the documents generation system to receive input which may or may not contain a value for a variable, but which includes, as a separate matter, an indication of whether or not the state of the variable is definite. Thus, for example, a user may defer providing a value for a queried variable, or provide a value for a queried variable together with an indication that the value is unsure. Thus, the system allows for more efficient capture of information.

Preferably, the system is capable of receiving a plurality of mutually independent indications of whether or not the respective states of a respective plurality of variables are definite, the plurality of indications being received in a single response to a request for input information. Thus, for example, a user presented with an options list, may indicate that some options are definitely required or not required, and that others are unsure. Other aspects of the present invention are set out in the appended claims. There now follows, by way of example only, a detailed description of preferred embodiments of the present invention in which:

BRIEF DESCRIPTION OF THE DRAWINGS

FIGS. 5a, b and c show a simple document template (FIG. 5a) and two customized documents (FIGS. 5b, c) that may be generated in a document generation system in which all further information must be received;

FIGS. 6a, b, c, and d show conventional two-state logic tables for the logical operators AND, OR, XOR and NOT;

FIGS. 7a, b, c, and d show three-state logic tables for the logical operators AND, OR, XOR and NOT according to the present invention;

FIG. 8 shows a three-state logic comparison table for the comparators IS, IS NOT, LESS THAN and MORE THAN;

FIG. 9 shows a relatively more complex document template than that of FIG. 5a;

FIGS. 10a, b, c, d, e, f, and g show input forms for user input of further information in which some answers may be provided, some may be deferred and some may be provided but marked as unsure;

FIGS. 11a, b, c to 19a, b, c show input forms as provided with full or partial information by a user (FIGS. 11a to 19a), deduced rule evaluations (FIGS. 11b to 19b), and the generated fully or partially customized documents that result (FIGS. 11c to 19c).

DETAILED DESCRIPTION OF CERTAIN INVENTIVE EMBODIMENTS

Figure 1:
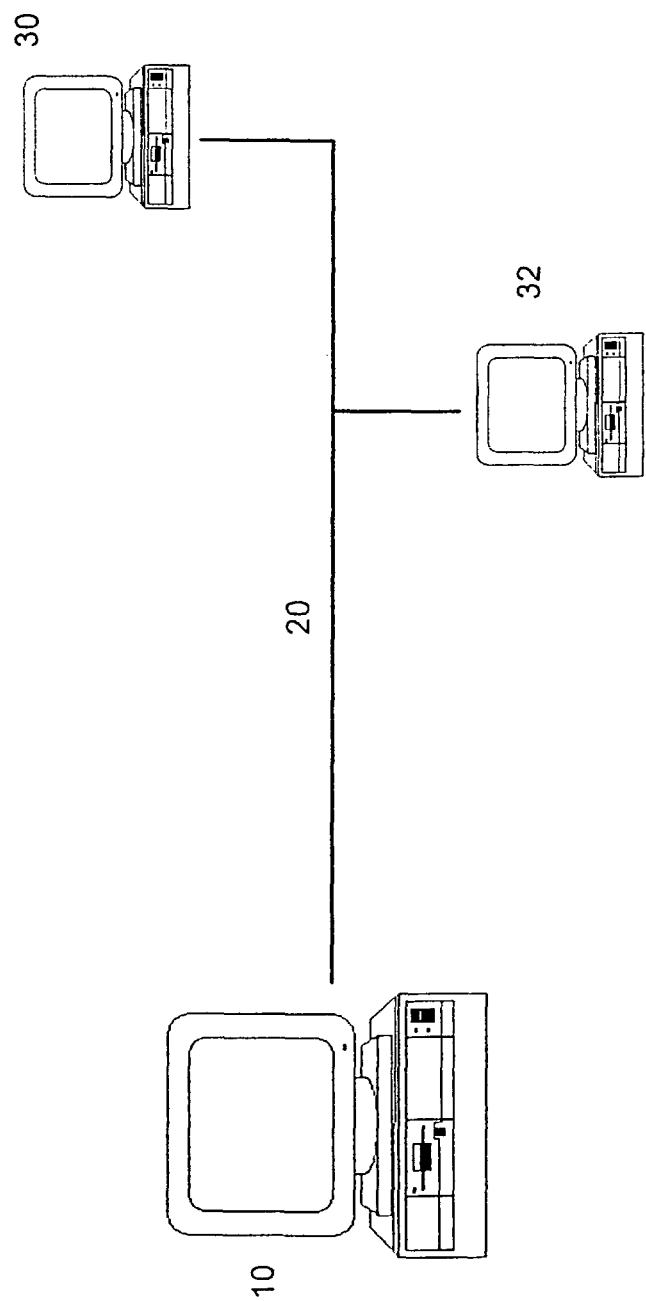
FIGS. 1, 2, and 3 are schematic diagrams showing a typical networked arrangement of computers suitable for implementing the present invention.
Figure 2:
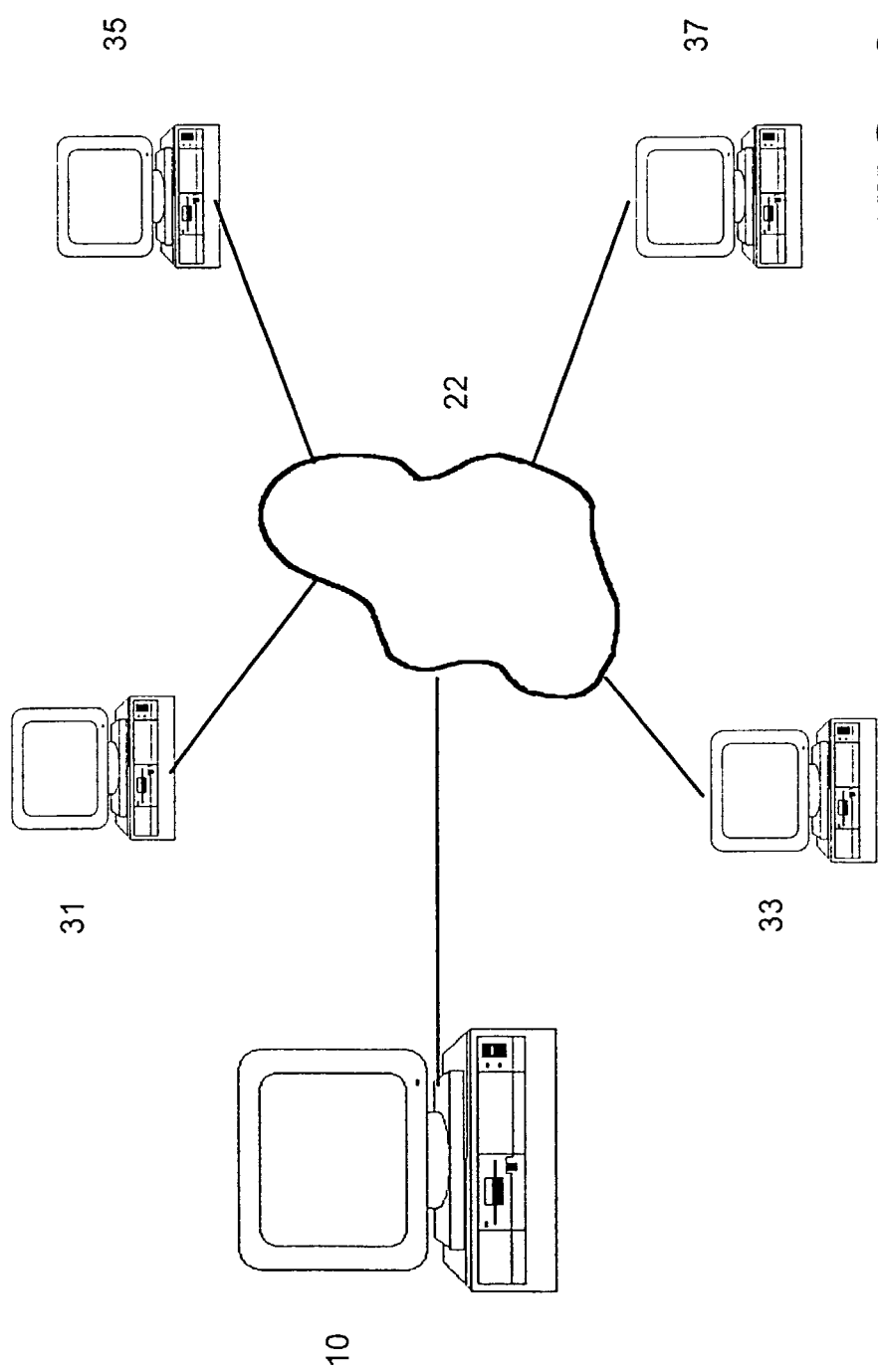
Figure 3:
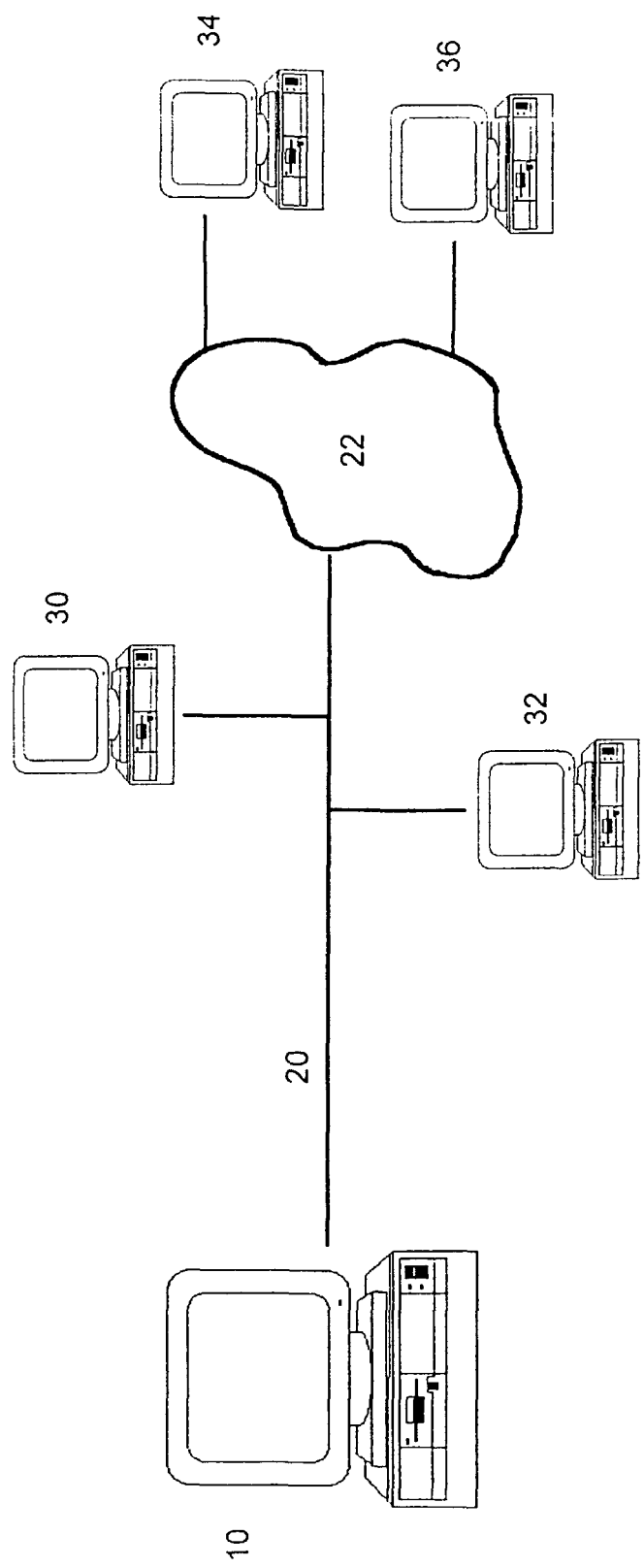

The present invention is implemented using one or more data processing means including a non-transitory computer-readable data storage medium. Where more than one data processing means are used, they are connected together using communication means. Client/server architecture is used. One of the data processing means functions as a server and the other data processing means function as clients. If the present invention is implemented using one data processing means, the single data processing means functions as both server and client. FIGS. 1, 2 and 3 show typical arrangements of data processing means and communication means for implementing the present invention.

FIG. 1 shows a server computer 10 connected to two local client computers 30 and 32 by means of a local area network (LAN) 20. Each computer 10, 30 and 32 runs an operating system program such as Microsoft Windows 2000 Professional™ and network programs such as Novell Netware™. The server computer 10 also runs a Web server application such as Microsoft Internet Information Server™. Each of the local computers 30 and 32 also run a browsing application such as Microsoft Internet Explorer™. Server computer 10 and local computers 30 and 32 communicate with each other using Transmission Control Protocol/Internet Protocol (TCP/IP) and Hypertext Transfer Protocol (HTTP). Together, server computer 10, local computers 30 and 32, and LAN 20 form an intranet.

FIG. 2 shows server computer 10 connected to four client computers 31, 33, 35 and 37, which may be local or remote, by means of connections to the Internet 22. Each computer 10, 31, 33, 35 and 37 runs an operating system program such as Microsoft Windows 2000 Professional™ and network programs such as Novell Netware™. The server computer 10 also runs a Web server application such as Microsoft Internet Information Server™ and is arranged to accept and respond to client requests from the Internet 22. Each of the computers 31, 33, 35 and 37 also run a browsing application such as Microsoft Internet Explorer™. Server computer 10 and computers 31, 33, 35 and 37 communicate with each other using Transmission Control Protocol/Internet Protocol (TCP/IP) and HTTP.

FIG. 3 shows a server computer 10 connected to two local client computers 30 and 32 using a LAN 20 and also connected to two remote client computers 34 and 36 through the Internet 22. Each computer 10, 30 and 32 runs an operating system program such as Microsoft Windows 2000 Professional™ and network programs such as Novell Netware™. Server computer 10 also runs a Web serving application such as Microsoft Internet Information Server™. Each of client computers 30, 32, 34 and 36 also run a browsing application such as Microsoft Internet Explorer™. Proxy servers and firewalls (not shown) may be used to protect the intranet from unauthorized access from computers connected to the Internet 22. Server computer 10, local computers 30 and 32 and remote computer 34 and 36 communicate with each other using TCP/IP and HTTP.

Henceforth in this document, the arrangement of computer systems and communication means as described above with reference to FIG. 3, being the most general of the arrangements described above, will be used to describe embodiments of the present invention.

One or more of the computer systems 10, 30, 32, 34 and 36 runs a word processing application such as Microsoft Word™. Microsoft Word™ is used to create document templates and may be used to view the fully or partially customized documents generated. As will be described below in greater detail, the document template consists of one or more predetermined elements of content for possible use when generating a customized document, and one or more associated rules for determining, on the basis of further information to be received, how to use the predetermined elements of content when generating a customized document.

Server computer 10 also runs a document generation program stored on the non-transitory computer-readable data storage medium which, when provided with a document template, generates one or more input forms to capture further information from a user, the input forms being generated on the basis of rules contained in the document template. The document generation program then generates a fully or partially customized document on the instruction of a user. The document generation program may be run as a server program and is instructed to perform tasks by users of client browser applications.

To generate a new fully or partially customized document from a document template, the user of a client computer instructs document generation program by passing a URL GET request or POST request to server computer 10. The document generation program initiates a session with the user of the client computer. On the basis of the document template, the document generation program may generate one or more Web input forms which are passed via a Web server application to the client computer. The Web input forms use the standard data-entry features of Hypertext Mark-up Language (HTML) such as push buttons, free-form text entry boxes, tick boxes, pull-down menu list boxes, radio buttons, and other graphical user interface (GUI) means for inputting information. It will be understood that the document generation program may generate multiple input forms for distributing to and capturing further information from the users of one or more further client computers. Similarly, the document generation program may generate multiple input forms for capturing further information from a user of one client computers in stages. However, for the purpose of describing the process followed by the document generation program, it will be assumed that only one user of one client computer is involved.

Figure 4:
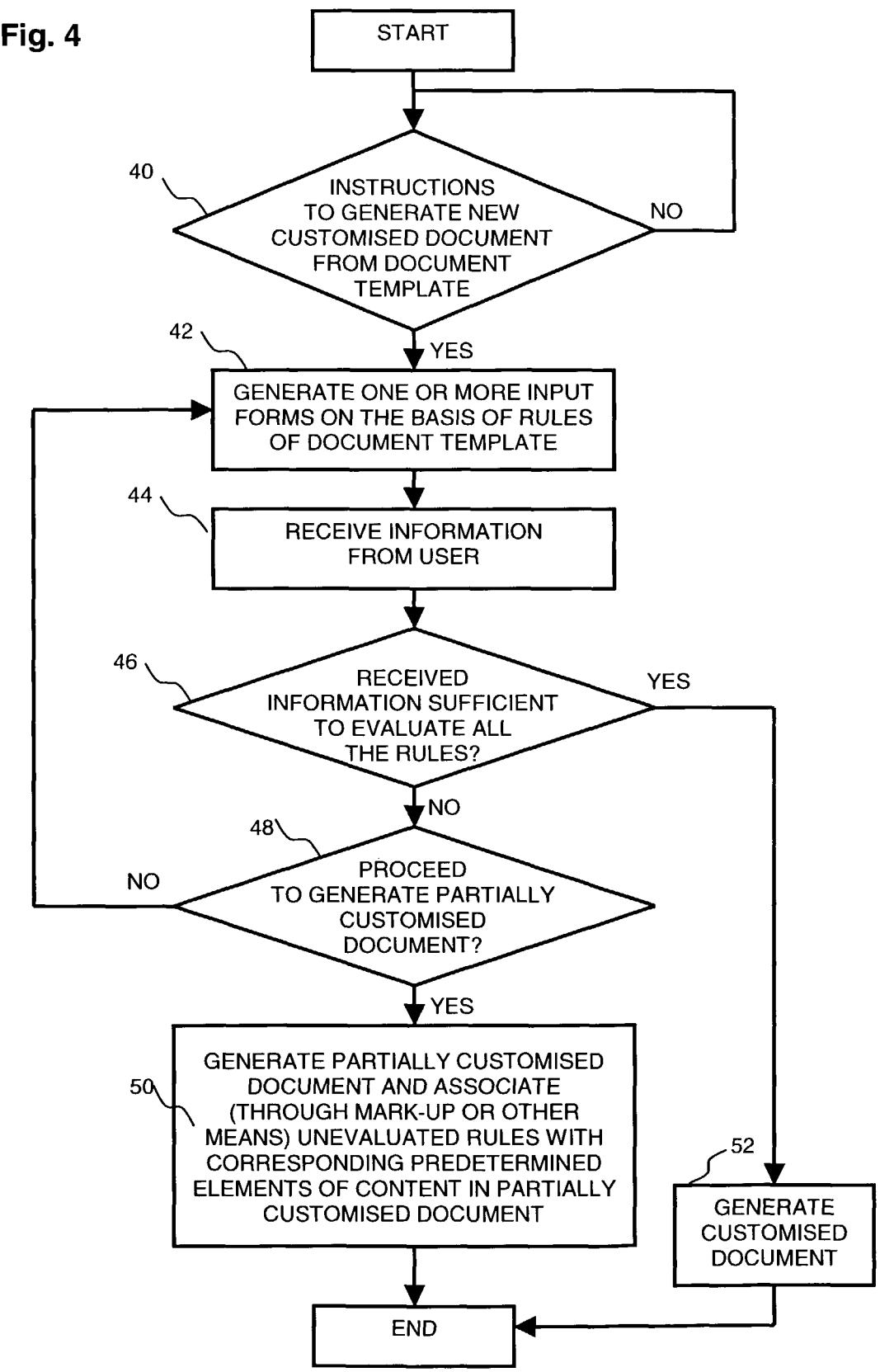
FIG. 4 is a flow diagram showing the process followed by a document generation system according to the present invention.

FIG. 4 is a flow diagram showing the process followed by the document generation program. At step 40, the document generation program waits for an instruction from the user to generate a new customized document from a document template. On receiving such an instruction, the document generation program generates, at step 42, a first input form on the basis of the rules contained in the document template. The user then enters information, using the input form, which is received by the document generation program at step 44. Then, at step 46, the document generation program determines whether the received information is sufficient to evaluate all the rules. If yes, the process continues to step 52 where the document generation program generates a customized document. If not, the process continues to step 48 where the document generation program determines whether or not it should proceed to generate partially customized document nonetheless. If it should, the process continues to step 50 where server computer 10 generates a partially customized document. Importantly, the partially customized document contains not only the predetermined elements of content the use of which has been determined, according to the evaluated rules, but also the rules which have not been evaluated in association with the predetermined elements of content corresponding to those rules, as will be described below. The association between the predetermined elements of content and rules may be represented by means of mark-up.

On the other hand, if document generation program determines, at step 48, that it should not proceed to generate partially customized document, the process continues to step 42 where server computer 10 generates a further input form for capturing the further required information and sends it to the client computer. The process then continues as before.

Whether or not server computer 10 should proceed to generate partially customized document not having received all the further information required to generate a fully customized document may be indicated by the user when submitting the preceding input form. For example, an optional tick box may be provided to so indicate. In further embodiments of the present invention, the document generation program may be instructed to generate a partially customized document, by not evaluating a rule, despite sufficient information having been received to enable the rules to be evaluated. In this case, the partially customized document will again be generated as described above, ie. it will contain not only the predetermined elements of content the use of which has been determined, according to the evaluated rules, but also the rules which have not been evaluated in association with the predetermined elements of content corresponding to those rules.

The present invention may be better understood by describing an example document template and various partially or fully customized documents that may be generated from it. First, however, it is useful to briefly describe a simple example document template and two customized documents that may be generated by a document generation system in which all further information must be received and in which all decisions concerning whether or not to include predetermined elements of content must be made, resulting in customized documents that either contain the elements of content or omit the elements of content depending upon whether the associated rules evaluate to true or false, respectively.

Suppose an agreement contains two jurisdiction clauses, one for England and Wales and the other for Scotland. This might be represented in a document template as shown in FIG. 5a. FIG. 5a comprises two clauses for possible inclusion in the customized document (two jurisdiction clauses) and two associated rules. Note that the clauses, and their association with the rules, are identified in the document template by means of mark-up—namely, left and right square brackets for surrounding the clauses together with superscript and subscript numerals associating the clauses with their corresponding rules which are themselves preceded by corresponding numerals.

The rules in FIG. 5a are dependent on a single variable "Jurisdiction." The rules are:
1) Jurisdiction IS "England and Wales"
2) Jurisdiction IS "Scotland"

The rules, when evaluated to either true or false, determine whether or not their corresponding clauses are included in the generated customized document. Thus, if rule 1) is true then a customized document is generated containing the England and Wales jurisdiction clause as shown in FIG. 5b, whereas, if rule 2) is true then a customized document is generated containing the Scotland jurisdiction clause as shown in FIG. 5c.

The present invention introduces the possibility that a partially customized document may be generated, despite the document generation program not evaluating all the rules. For example, a value for the variable "Jurisdiction" may not be received, in which case neither of rules 1) and 2) above may be evaluated. In rule-based systems, complex rules may be formed by combining simple rules (or variables which evaluate to true or false) using logical operators or comparators. Evaluation may or may not be possible for a complex rule depending on whether evaluation is possible for the simple rules it is constructed from and depending on the logical operators or comparators used for construction. Where a simpler rule is unevaluated, we shall refer to it as having a value "indefinite." When complex rules are constructed from simple rules which may be unevaluated (indefinite), expanded rules of logic are required. For reference, conventional two-state logic tables are shown at FIGS. 6a, 6b, 6c and 6d for the logical operators AND, OR, XOR and NOT. The present invention uses a three-state logic as shown for the logical operators AND, OR, XOR and NOT in the logic tables of FIGS. 7a, 7b, 7c and 7d. Thus, for example, the complex rule:

(Jurisdiction IS "England and Wales") OR (Jurisdiction IS "Scotland")

may be evaluated using logical rules as set out in the table of FIG. 7b. If (Jurisdiction IS "England and Wales") is false then the complex rule:
(Jurisdiction IS "England and Wales") OR (Jurisdiction IS "Scotland") is:
1) true, if (Jurisdiction IS "Scotland") is true
2) false, if (Jurisdiction IS "Scotland") is false
3) indefinite (cannot be evaluated), if (Jurisdiction IS "Scotland") is indefinite.

According to the present invention, when querying a user to provide information, ie a value for a variable, the user may 1) provide a sure value, 2) defer the query by not providing a value, or 3) provide a value but indicate that it is unsure. The process followed by a document generation program according to the present invention when deferring a query or indicating that a provided value is unsure will be described below. However, it will be understood that, where a comparison is made between a first value and a second value, and the first value is deferred or indicated as unsure, it may not be possible to evaluate the comparison even if the second value is sure.

FIG. 8 shows a table setting out the possible outcomes where a first value (which is either sure, unsure or deferred) is compared to a second value (which is sure) using four comparators IS, IS NOT, LESS THAN and MORE THAN. Thus, for example, the comparison (Jurisdiction IS "England and Wales") is:

1) indefinite (cannot be evaluated) if the variable Jurisdiction is "England and Wales" but is indicated as UNSURE;
2) false if the variable Jurisdiction is not "England and Wales" even though it is indicated as UNSURE; and
3) indefinite (cannot be evaluated) if the variable Jurisdiction has been deferred.

A slightly more complex example of a document template will now be described together with input forms which may be generated to capture the required further information and the fully or partially customized documents which may be generated, depending on the information received. The following examples will illustrate the effects on fully or partially customized documents when 1) definitive (ie sure) choices are made; 2) choices are deferred; 3) choices are made but deemed to be unsure and 4) combinations of the above.

Consider a document template containing a clause for the governing Law with variations that depend upon whether the jurisdiction is England and Wales, Scotland or Japan. Furthermore, in the case of Japan, disputes can be resolved in either the district court of Tokyo or the district court of Kyoto. Such a document template might be represented as shown in FIG. 9 which adopts the same style of mark-up as described above. The rules governing such a document template are not particularly complex, but the variety of possibilities for user input of information and the variety of resulting fully or partially customized documents that may be generated as a result are rich.

FIG. 10a shows an input form for capturing the values of the variables Jurisdiction and JapaneseCourt. For each variable there are a number of form fields that can be presented in an input form: 1) a prompt for the variable; 2) the variable input which is determined by its type and possible selections; 3) a single checkbox whereby the user indicates that the variable is deferred; 4) a single checkbox whereby the user indicates that they are unsure of the answer to a group of possible selections; and 5) a group of checkboxes whereby the user indicates which selections they are unsure about.

The relevance of the JapaneseCourt variable is determined by the value of the Jurisdiction variable, and is irrelevant if the Jurisdiction is not "Japan". This dependency relationship is deducible from the document template since the JapaneseCourt variable is only mentioned in the clause that is controlled by Jurisdiction="Japan". Thus, when the user selects either of the other options for Jurisdiction the form fields for the JapaneseCourt variable are dynamically disabled as shown in FIG. 10b.

If the user defers the Jurisdiction variable then three changes are dynamically made to the input form: 1) the input field for the variable is disabled; 2) the unsure checkbox is disabled; and 3) all variables that are dependent upon the Jurisdiction are re-enabled as shown in FIG. 10c. Similarly if the JapaneseCourt variable is also deferred the input form is dynamically changed as shown in FIG. 10d.

If the user is unsure about the Jurisdiction variable then three changes are dynamically made to the input form: 1) the input field for the variable is changed to a group of checkboxes so that multiple selections can be made; 2) all of the selections are pre-checked; and 3) all variables that are dependent upon the Jurisdiction are re-enabled as shown in FIG. 10e. Similarly if the user is also unsure about which JapaneseCourt the input form is dynamically changed as shown in FIG. 10f.

With unsure answers, as with sure answers, the dependencies between variables are maintained. Thus, if the user is unsure as to whether the Jurisdiction is "England and Wales" or "Scotland" but sure that it is not "Japan" then the JapaneseCourt variable is disabled as shown in FIG. 10g.

The following rules define the circumstances when the form fields for a variable are enabled/disabled:

1) Let V be a variable that occurs k times in a document template.
2) Let $L_1, L_2, \ldots L_k$ be the logic statements in the document template that control each occurrence of variable V.
3) Let $F_{prompt}$ be the static prompt field for variable V.
4) Let $F_{input}$ be the type-specific input field for variable V.
5) Let $F_{defer}$ be the defer checkbox for variable V.
6) Let $F_{unsure}$ be the unsure checkbox for variable V.
7) Let $F_{unsure-group}$ be the group of checkboxes denoting the possible selections for variable V.

Then the enable/disable behavior of $F_{prompt}$ is defined as follows:
IF ($L_1$ OR $L_2$ OR . . . OR $L_k$) EVALUATES TO (true OR indefinite)
AND $F_{defer}$ IS NOT CHECKED
THEN ENABLE $F_{prompt}$
ELSE DISABLE $F_{prompt}$ The enable/disable behavior of $F_{input}$ is defined as follows:
IF ($L_1$ OR $L_2$ OR . . . OR $L_k$) EVALUATES TO (true OR indefinite)
AND $F_{defer}$ IS NOT CHECKED
AND $F_{unsure}$ IS NOT CHECKED
THEN ENABLE $F_{input}$
ELSE DISABLE $F_{input}$ The enable/disable behavior of $F_{defer}$ is defined as follows:
IF ($L_1$ OR $L_2$ OR . . . OR $L_k$) EVALUATES TO (true OR indefinite)
AND $F_{unsure}$ IS NOT CHECKED
THEN ENABLE $F_{defer}$
ELSE DISABLE $F_{defer}$ The enable/disable behavior of $F_{unsure}$ is defined as follows:
IF ($L_1$ OR $L_2$ OR . . . OR Lk) EVALUATES TO (true OR indefinite)
AND $F_{defer}$ IS NOT CHECKED
THEN ENABLE $F_{unsure}$
ELSE DISABLE $F_{unsure}$ The enable/disable behavior of $F_{unsure-group}$ is defined as follows:
IF ($L_1$ OR $L_2$ OR . . . OR $L_k$) EVALUATES TO (true OR indefinite)
AND $F_{defer}$ IS NOT CHECKED
AND $F_{unsure}$ IS CHECKED
THEN ENABLE $F_{unsure-group}$
ELSE DISABLE $F_{unsure-group}$ According to the present invention, whenever a rule associated with an element of content is not evaluated (ie is indefinite), the rule is included in any partially customized document generated in association with its corresponding elements of document content. The corresponding elements of document content are those which would have been included if the rule had evaluated to true, however, they are marked-up in a fashion which indicates that they are still conditional—ie they are still elements of content for possible use when generating further customized documents from the partially customized document and are not included in the document as final content. The mark-up used may be the same as the document template from which the partially customized document was generated. For example, the mark-up may use right and left square brackets, superscript and subscript numerals to identify the unevaluated rules, the corresponding elements of content and their association. On the other hand, the mark-up may be different in style or format to that used in the document template.

Where no rules have been evaluated (for example where all variables have been deferred) the generated document will contain all the elements of document content of the document template marked-up to indicate they are still conditional. If the mark-up style is the same, the generated document will normally be identical to the document template. However, it is also possible to include additional mark-up, for example guidance notes or other information.

FIGS. 11 to 19 show various input forms (FIGS. 11a to 19a) as provided with full or partial information by a user, the rule evaluations (or non-evaluations) that are deduced from the information provided (FIGS. 11b to 19b), and the fully or partially customized documents that are generated as a result (FIGS. 11c to 19c).

Thus, FIGS. 11 to 14 show four input forms as provided with the four possible sure answers: 1) Jurisdiction="England and Wales" (FIG. 11a), Jurisdiction="Scotland" (FIG. 12a), 3) Jurisdiction="Japan" and JapaneseCourt="Tokyo" (FIG. 13a), and 4) Jurisdiction="Japan" and JapaneseCourt="Kyoto" (FIG. 14a). The deduced rule evaluations are shown in FIGS. 11b, 12b, 13b and 14b, respectively, and the generated customized documents are shown in FIGS. 11c, 12c, 13c and 14c, respectively. Note that all of the rules are evaluated (no indefinites) since the answers provided are all sure. Similarly, note that the generated customized documents are final in that they contain no rules or corresponding conditional clauses.

FIGS. 15 and 16 show two input forms as provided with two deferred answers 1) Jurisdiction="Japan" and JapaneseCourt is deferred (FIG. 15a), and 2) both Jurisdiction and JapaneseCourt are deferred (FIG. 16a). The deduced rule evaluations are shown in FIGS. 15b, and 16b, respectively, and the generated partially customized documents are shown in FIGS. 15c and 16c, respectively. Note that the rules corresponding to deferred variables are not evaluated (indefinite) and that the generated customized documents are partially customized in that they contain those rules which were not evaluated associated with corresponding clauses marked-up to indicate their conditional nature. Thus, in FIG. 15b, the only rules not evaluated are JapaneseCourt IS "Tokyo" and JapaneseCourt IS "Kyoto" and the generated partially customized document (FIG. 15c) contains those rules. Furthermore, the only clauses which are marked-up in FIG. 15c are those dependent on the evaluation of the those rules. The remainder of the document is in final form. However, in FIG. 16b, all the rules remain unevaluated and the generated document (FIG. 16c) is identical to the document template of FIG. 9 since all the rules are included and all the content is marked-up and associated with the rules.

FIGS. 17 to 19 show three input forms as provided with three unsure answers 1) Jurisdiction is unsure—either "England and Wales" or "Scotland" and not "Japan" (FIG. 17a), 2) Jurisdiction is unsure—either "England and Wales" or "Japan" and, if "Japan", JapaneseCourt is "Kyoto" (FIG. 18a), and 3) Jurisdiction is unsure but either "England and Wales" or "Japan", but JapaneseCourt is deferred. The deduced rule evaluations are shown in FIGS. 17b, 18b and 19b, respectively, and the generated partially customized documents are shown in FIGS. 17c, 18c and 19c, respectively. Note that the rules corresponding to unsure and deferred variables are not evaluated (indefinite) and that the generated customized documents are partially customized in that they contain those rules which were not evaluated associated with corresponding clauses marked-up to indicate their conditional nature.

Thus, in FIG. 17b, the rules Jurisdiction="England and Wales" and Jurisdiction="Scotland" are not evaluated (indefinite) and the generated partially customized document (FIG. 17c) contains those rules. Furthermore, the clauses corresponding to those rules are included in FIG. 17c and marked-up to show their association with the rules. The generated document contains no final content, but it is partially customized in that some of the rules and corresponding clauses in the original document template have been dispensed with as a result of the provision of partial information.

Similarly, in FIG. 18b, the rules Jurisdiction="England and Wales" and Jurisdiction="Japan" are not evaluated (indefinite) and the generated partially customized document (FIG. 18c) contains those rules. Furthermore, the clauses corresponding to those rules are included in FIG. 17c and marked-up to show their association with the rules. The generated document contains no final content, but it is partially customized in that some of the rules and corresponding clauses in the original document template have been dispensed with as a result of the provision of partial information.

Finally, in FIG. 19b, the rules Jurisdiction="England and Wales", Jurisdiction="Japan", JapaneseCourt="Tokyo", and JapaneseCourt="Kyoto" are not evaluated (indefinite) and the generated partially customized document (FIG. 19c) contains those rules. Furthermore, the clauses corresponding to those rules are included in FIG. 19c and marked-up to show their association with the rules. The generated document contains no final content, but it is partially customized in that one of the rules (Jurisdiction="Scotland") and the corresponding element of content in the original document template have been dispensed with as a result of the provision of partial information.

The present invention is not limited to the predetermined elements of content in document templates and partially customized documents being text. Content may include text, formatting, pictures, sounds and other digital multimedia. Furthermore, the present invention is not limited to the mark-up described above. Any format or style of mark-up or other indication may be used to indicate rules, their corresponding elements of content and the association between them. Furthermore, the rules and the elements of content in document templates and partially customized documents need not be contained in the same document or other data file. In general, the rules and elements of content may be represented in one or more documents or data files, provided that the associations between rules and elements of content may be determined using the one or more files.

The present invention is also not limited to document generation systems which capture further information required to generate a fully or partially customized document form users via user interfaces such as the input forms described above. Other types of input form may be employed and, moreover, further information may be captured from sources other that users, for example from databases and expert systems.

What is claimed is:

1. A document generation program recorded on a non-transitory computer-readable data storage medium comprising:

logic configured to be utilized by a first computer to process a document template which includes elements of content which are non-conditional, elements of content which are conditional, and rules for the use of the elements of conditional content, including:

logic configured to use input information from an information capture document to evaluate ones of the rules which can be evaluated, where not all of the rules can be evaluated; and logic configured to generate a partially customized document including the elements of non-conditional content, elements of conditional content selected based on the evaluated rules, unevaluated rules, and elements of conditional content corresponding to the unevaluated rules; and logic configured to be utilized by a second computer to generate a fully customized document without reference to the document template from the partially customized document including the elements of non-conditional content and elements of conditional content selected based on the evaluated rules by using further input information to evaluate the unevaluated rules to select at least some of the elements of conditional content from the partially customized document.

2. The document generation program according to claim 1, wherein the unevaluated rules are represented in the partially customized document as mark-up of the corresponding elements.

3. The document generation program according to claim 1, wherein the partially customized document is generated in response to input information which is not sufficient to evaluate the unevaluated rules.

4. The document generation program according to claim 1, wherein the partially customized document is generated in response to input information which is sufficient to evaluate at least some of the unevaluated rules, and which indicates that at least one of the unevaluated rules should not be evaluated.

5. A document generation system comprising:
one or more first computers which are configured to:
access a document template comprising predetermined elements of content for possible use when generating a customized document;
access data associated with the document template, the data representing first and second rules for making, respectively, first and second determinations as to the use to be made of the predetermined elements of content when generating a customized document, the first and second determinations each requiring further information to be received;
receive information enabling at least the first determination to be made;
make the first determination on the basis of the received information;
generate a partially customized document in accordance with the outcome of the first determination such that the partially customized document includes an element of conditional content selected based on evaluation of the first rule; and
associate, with the generated partially customized document, data representing the second rule; and
one or more second computers which are configured to:
receive the partially customized document and associated data representing the second rule;
receive information enabling at least the second determination to be made; and
make the second determination without reference to the document template on the basis of the received information and the data representing the second rule associated with the partially customized document.

6. The system according to claim 5, wherein the predetermined elements of content enable customized documents to be generated, from the document template, for each possible combination of outcomes of both the first and second determinations.

7. The system according to claim 5, wherein the first and second rules are represented in the document template in the form of mark-up of the predetermined elements of content.

8. The system according to claim 5, wherein the partially customized document comprises one or more of the predetermined elements of content selected to enable further customized documents to be generated, from the partially customized document, for each possible outcome of the second determination.

9. The system according to claim 8, wherein the second rule is represented in the partially customized document in the form of mark-up of the selected one or more elements of content.

10. The system according to claim 5, wherein the received information comprises at least part of the information required to enable the second determination to be made and an indication that the second determination should not be made.

11. The system according to claim 5, wherein the one or more computers generate a request to receive information enabling at least the second determination to be made, the received information being validly received in response to the request.

12. The system according to claim 11, wherein the generated request is a user request presented to a user in the form of a user interface.

13. The system according to claim 11, wherein the generated request is a database query.

* * * * *